United States Patent [19]

Granger et al.

[11] 3,996,828

[45] Dec. 14, 1976

[54] DEVICE FOR CUTTING LONGITUDINAL STRIPS FROM REELS OF MATERIALS IN STRIP OR FOIL OR SHEET OR SIMILAR FORM OR OF REDUCED THICKNESS

[76] Inventors: Maurice Granger, 28 rue Charles de Gaulle, 42000 Saint-Etienne-Loire, France; André Lerond, 174 rue Leon Blum, 69100 Villeurbanne-Rhone, France; Olivier Failliot, Rochefort en Yvelines, Yvelines, France

[22] Filed: Apr. 15, 1975

[21] Appl. No.: 568,370

[30] Foreign Application Priority Data

Apr. 16, 1974 France ............................ 74.13968

[52] U.S. Cl. .................................. 83/500; 83/505; 83/508.2

[51] Int. Cl.² ..................... B23D 19/06; B26D 1/28

[58] Field of Search ............ 83/495, 498, 500, 501, 83/505, 508.2, 508.3

[56] References Cited

UNITED STATES PATENTS

| | | | |
|---|---|---|---|
| 658,025 | 9/1900 | Smith | 83/505 X |
| 1,139,355 | 5/1915 | Feeley | 83/500 X |
| 2,000,175 | 5/1935 | Johnstone et al. | 83/505 X |
| 3,126,780 | 3/1964 | Booth | 83/500 |

*Primary Examiner*—Leonidas Vlachos
*Assistant Examiner*—W. D. Bray
*Attorney, Agent, or Firm*—Haseltine, Lake & Waters

[57] ABSTRACT

A device for cutting longitudinal strips from reels of material in sheet form comprising a frame carrying a rotatable shaft to which is secured a disc having an annular peripheral surface which in transverse section has a rouned profile against which bears two cylindrical bearing surfaces formed on a rotatable member carried by an arm pivotably connected to the frame. The cylindrical bearing surfaces are separated from one another and disposed in different planes for contacting the rounded profile of the peripheral surfaces at spaced locations on the rounded profile. The bearing surfaces can be formed on spaced roller bearings whose inner cages are secured in axially spaced rotation on the supporting spindle. The bearing surfaces can also be formed on a ring having a groove therein.

11 Claims, 5 Drawing Figures

DEVICE FOR CUTTING LONGITUDINAL STRIPS FROM REELS OF MATERIALS IN STRIP OR FOIL OR SHEET OR SIMILAR FORM OR OF REDUCED THICKNESS

The invention relates to a device for cutting longitudinal strips from reels of materials in strip or foil or sheet or similar form or of reduced thickness.

The subject of the invention comes under the technical heading of machinery for cutting thin materials such as paper, wadding, fabrics, plastics, aluminum foils and so on.

For some uses, reels of material are manufactured in the form of sheets or foils or the like measuring several hundreds of meters in length and of considerable width, for examples, for use in towel distributors or the like, house-hold aluminum foils, fabrics, plastics sheets or foils or films or the like.

To deliver these enormous reels in the form of small reels suitable for being placed in distributors, complex machines have been suggested in which the strip of material unwound from the reel travels below pressing rollers associated with cutting blades for separating the strip into a number of strips or bands. Such systems are not completely satisfactory because the blades wear rapidly, making fitting work necessary, output is low and first costs fairly high.

It is an object of the invention to provide a simple, low cost and high-output device for cutting material into strips, the device having interchangeable and adjustable elements making for great flexibility.

The device according to the invention comprises at least one disc which has a rounded periphery and which is rigidly secured to a shaft freely rotatable in a frame, and at least one rotating member embodied by two cylindrical bearing surfaces separated from one another by a groove or throat or the like adapted to be pressed into engagement with the disc periphery, the rotating member being carried by one or more arms which are pivoted to the frame and which may or may not be connected to the disc, the material which it is required to cut into strips being moved between the disc and the rotating member either by the disc spindle being driven or by the material being driven.

These and other features will become apparent from the following description.

To give some idea of the object of the invention but without any limitation, in the accompanying drawings.

Figure 1:
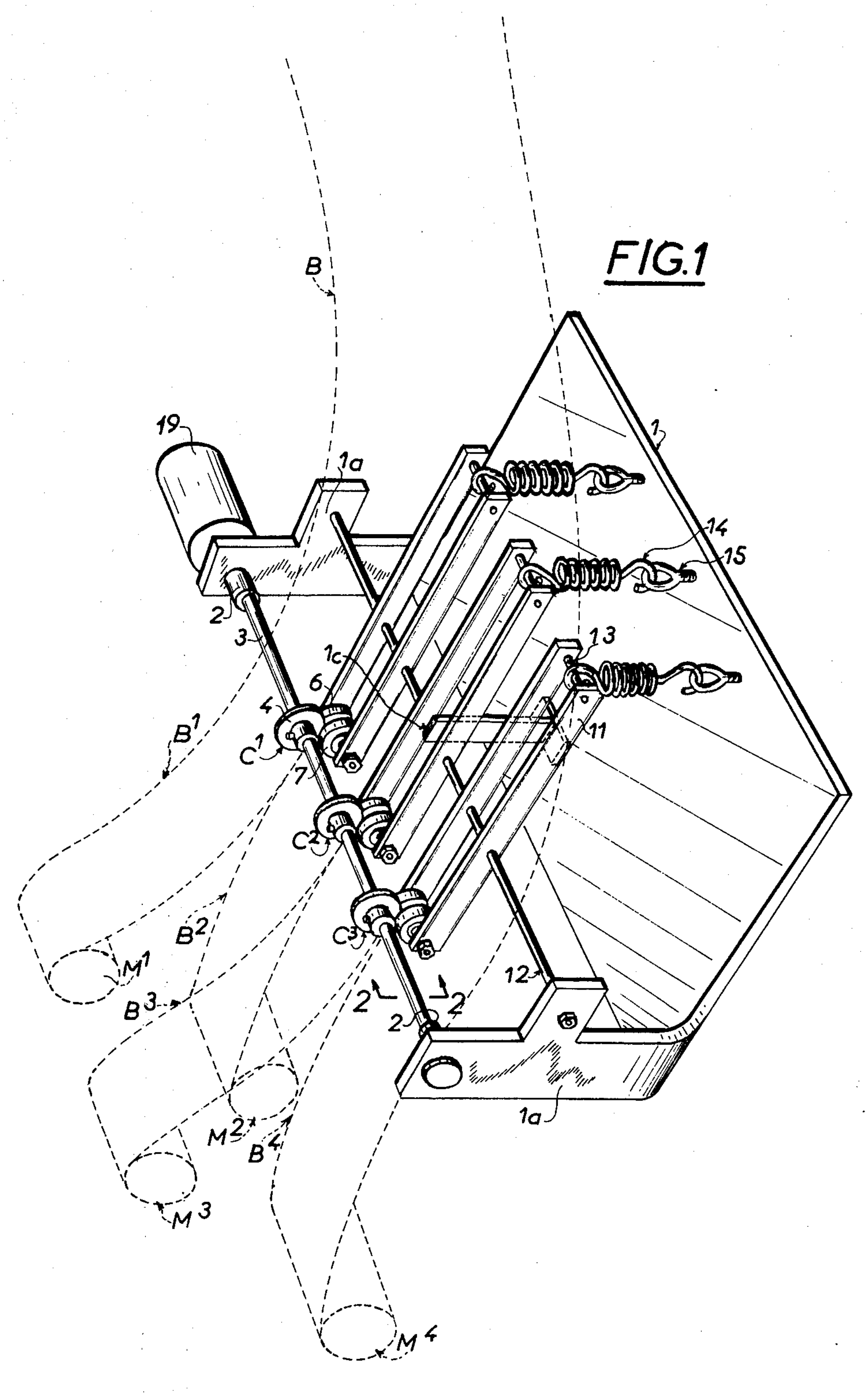
FIG. 1 is a perspective view showing an embodiment of the device according to the invention.

To give a better idea of the subject of the invention, it will now be described with reference to non-limitative embodiments which are shown in the drawings.

The main requirement is to convert an input of a very wide strip or band or the like coming off a reel into an output of narrow strips or bands or the like by cutting the original wide strip at one or more places across its width.

Accordingly, the large (feed) reel of material is placed on a support (not shown) which may or may not be rigidly secured to the device and through which a strip or band B of material passes to be cut into a number of small strips or bands B1, B2, B3 and B4 which are reeled on to hubs M1, M2, M3, M4 which may or may not be rotated by one or more motor or drive means of any kind (FIG. 1).

The cutting facility shown in FIG. 1 basically comprises a frame 1 having two oppositely disposed raised parts *1a*, a spindle 3 being mounted at the top of the parts *1a* with the interposition of bearings 2 so that it can rotate freely.

Figure 2:
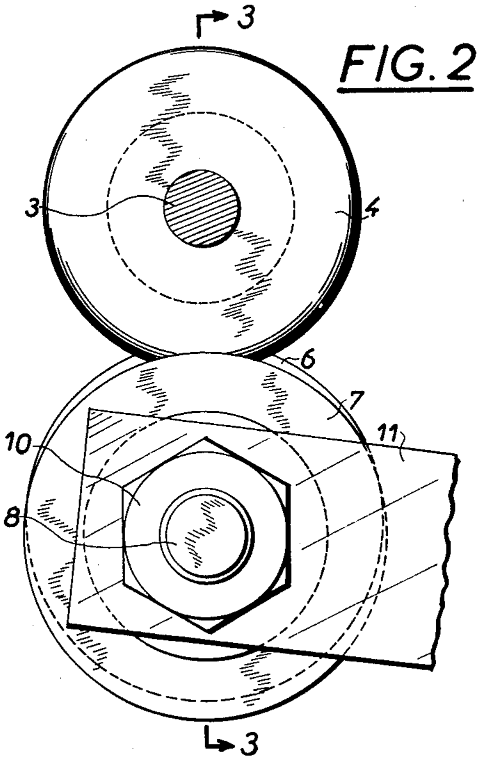
FIG. 2 is a view in section taken on the line 2—2 in FIG. 1.
Figure 3:
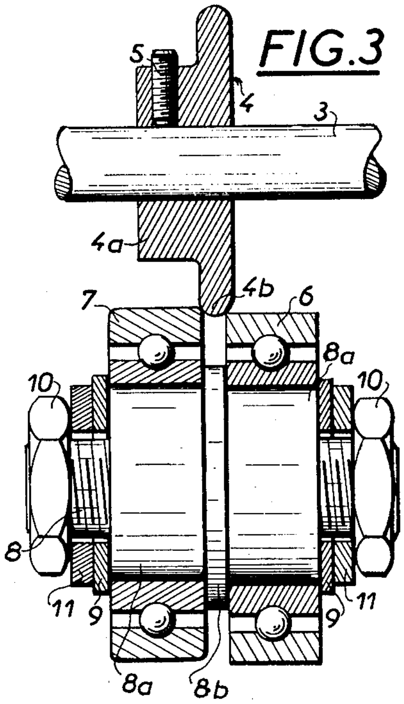
FIG. 3 is a view in section taken on the line 3—3 in FIG. 2.

The embodiment shown has three cuttings systems C1, C2, C3, the number not being limitative. The systems comprise discs 4 having hubs *4a* which are slideable on the spindle 3 and which are secured thereto for rotation therewith by any means, such as screws 5. The discs 4 have a rounded periphery *4b* on which the edges of cylindrical elements disposed below the discs 4 bear. In the embodiment shown in FIGS. 1, 2 and 3 the cylindrical elements take the form of two ball or other rolling bearings 6, 7 which are clamped to cylindrical bearing surfaces *8a* of a spindle 8 and which are separated from one another by a step or shoulder *8b* of spindle so that the inner edges of the rolling bearings 6, 7 contact the rounded periphery *4b* of the disc 4.

On each side of the rolling bearings the spindle 8 is locked by discs and nuts 10; disposed between washers 9 and nuts 10 are arms 11 which are pivotally connected by a pivot spindle 12 to the parts *1a*, one or more intermediate bearings *1c* being provided. At their other ends each pair of arms is interconnected by a cross-member 13; connected thereto is an appropriately dimensioned helical spring 14 whose other end is connected at 15 to the frame or the like. The rolling bearings are free to be displaced. They therefore bear permanently and with some pressure on the disc 4. Pressure can of course be produced by other means such as counterweights or springs concentric with spindle 12 and so on.

To produce a clean cut in the material, whatever its nature, thickness and speed of movement may be, the rolling bearings must be devised specially. Accordingly, one of the rolling bearings, e.g. the bearing 7, has rounded edges while the side surfaces of the two cages or just of the outer cage of bearings 6 are machined to give sharp corners. Also, one of the bearings, e.g. the bearing 7, is positioned eccentrically so that the sharp-edged bearing 6 engages with the rounded edge or periphery *4b* of the disc 4 higher up than does the rounded-edge bearing 7. The bearing 6 therefore bears on the disc periphery *4b* without sliding despite the pressure, whereas the bearing 7 bears on the disc periphery *4b* with a tendency to slide or disengage from the disc, so that the bearing 7 can hold the material tightly and the bearing 6 can cut the material cleanly.

Preferably, both surfaces of bearing 6 are formed with a sharp edge so that the bearing 6 can be turned round when one end has worn.

Figure 4:
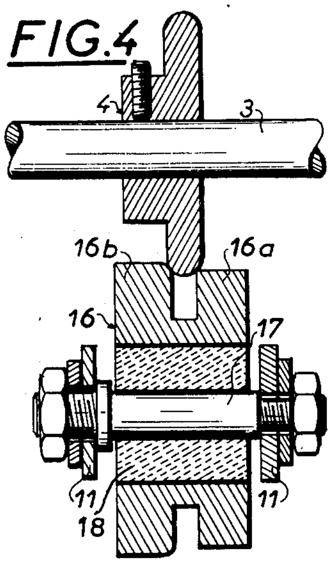
FIG. 4 is a sectional view showing another embodiment of the rotating member.

As a variant, instead of the rolling bearings 6, 7, a ring 16 is used which has two cylindrical bearing surfaces *16a*, *16b* separated by a groove or throat or the like. Of course, it is impossible to make one of the bearing surfaces eccentric in such a case, and so instead the rounded-edge bearing surface *16b* is made of larger diameter than the sharp-edged bearing surface *16a*. Ring 16 is freely rotatable on a spindle 17, preferably with the interposition of a self-lubricating ring 18 or of a rolling bearing, spindle 17 being carried by the arms 11 and retained by washers or the like and nuts (FIG. 4).

The material for cutting can be moved between the cutting elements by any drive or motor means. As seen previously, the material can be clamped and the spindle 3 rotated by hand to produce strips or bands B1, B2, B3, B4 for reeling on hubs M1, M2, M3, M4 which can in such a case be driven by a synchronously operating motor. Another possibility is to have a continuous manual drive (by hand crank) of spindle 3 and therefore of discs 4 and bearing 6, 7 or ring 16. A motor 19 can be provided on the frame (FIG. 1) to drive spindle 3.

These features make it possible to change the discs and the bearings or rings readily and rapidly in the event of wear or of changes in the material to be cut. Alterations to the spacing of the cutting elements and in their number are also convenient.

Figure 5:
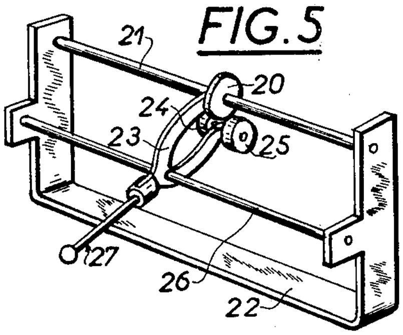
FIG. 5 is a diagrammatic perspective view showing an alternative embodiment of the device.

In a variant shown in FIG. 5, disc 20 of a cutting device is carried by a spindle 21 which is rigidly secured to a frame 22 and is rigidly secured to a support 23 which does not inhibit rotation of disc 20 and which is in the form of a swan neck or horseshoe or the like and made of spring steel so as to apply a pressure, rolling bearings 24, 25 or a ring being mounted for free rotation at the other end. In its central part the support 23 is mounted on a spindle 26 carried by the frame, and an operating lever 27 and means for locking the support are provided.

In this embodiment, the support can be slid over the entire width, locked in the selected position and used to cut two strips in the same way as hereinbefore described.

The invention is not limited to that of its uses nor to those embodiments of its various parts which have been more particularly disclosed but covers all variants.

What is claimed is:

1. A device for cutting longitudinal strips from reels of materials in sheet form of reduced thickness, said device comprising a frame, a shaft rotatably mounted in said frame, a disc secured to said shaft for rotation therewith, said disc having an annular peripheral surface which in transverse section has a rounded profile, an arm pivotably connected to said frame, a rotatable member mounted on said arm, means acting on said arm for urging said rotatable member into contact with the peripheral surface of the disc, said rotatable member having two cylindrical bearing surfaces separated from one another and disposed in different planes for contacting said rounded profile of the peripheral surface at spaced locations on said rounded profile, and means for feeding the material to be cut between the disc and the rotatable member.

2. A device as claimed in claim 1 comprising a rotatable spindle mounted on said arm and supporting said rotatable member, said spindle including a step with spaced cylindrical bearing surfaces, said rotatable member comprising two ball bearings including inner cages clamped against said bearing surfaces of said step.

3. A device as claimed in claim 2 wherein said ball bearings have outer surfaces which constitute said bearing surfaces which contact the peripheral surface of the disc.

4. A device as claimed in claim 3 wherein one of said bearing surfaces has a rounded edge and the other bearing surface has a sharp edge.

5. A device as claimed in claim 4 wherein said ball bearings have offset axes of rotation, the axis of rotation of the ball bearing with the rounded edge being closer to the axis of rotation of said disc.

6. A device as claimed in claim 5 wherein said rounded edge of the associated bearing surface contacts said rounded profile of the peripheral surface of the disc at a location closer to the axis of rotation of the disc as compared to the location of contact of the sharp edge of the associated bearing surface with the rounded profile of the peripheral surface of the disc such that under the pressure of the bearing surfaces against the peripheral surface of the disc and the offset axes of rotation of the ball bearings, the rounded edge bears slidingly on the rounded profile of the peripheral surface of the disc with a tendency to disengage thereby retaining the material to be cut, while the sharp edge bears tightly on the rounded profile of the peripheral surface of the disc to produce a clean cut in the material.

7. A device as claimed in claim 1 comprising a rotatable spindle mounted on said arm, said rotatable member being constituted by a ring rotatably mounted on said spindle and having a groove with said two cylindrical bearing surfaces bounding said groove, one bearing surface being of larger diameter than the other and having a rounded edge which slidingly bears against the rounded profile of the peripheral surface of the disc, the bearing surface of smaller diameter having a sharp edge which bears tightly against the rounded profile of the peripheral surface of the disc and serves as a cutting edge.

8. A device as claimed in claim 1 wherein said means urging the rotatable member into contact with the peripheral surface of the disc comprises a spring connected to said arm and to said frame.

9. A device as claimed in claim 1 wherein said disc is axially slidable on said shaft.

10. A device as claimed in claim 1 wherein said means for feeding the material comprises drivable hubs for receiving the cut strips of material.

11. A device as claimed in claim 1 wherein said means for feeding the material comprises drive means for driving the shaft in rotation.

* * * * *